(12) United States Patent
Jacob et al.

(10) Patent No.: US 10,046,527 B2
(45) Date of Patent: Aug. 14, 2018

(54) COMPOSITE COMPONENT AND METHOD FOR ITS PRODUCTION

(71) Applicant: GM GLOBAL TECHNOLOGY OPERATIONS LLC, Detroit, MI (US)

(72) Inventors: Tino Jacob, Leipzig (DE); Dirk Lungershausen, Wiesbaden (DE)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 473 days.

(21) Appl. No.: 14/666,785

(22) Filed: Mar. 24, 2015

(65) Prior Publication Data

US 2015/0273806 A1 Oct. 1, 2015

(30) Foreign Application Priority Data

Mar. 26, 2014 (DE) .......................... 10 2014 004 387

(51) Int. Cl.
*B29C 70/48* (2006.01)
*B29C 70/46* (2006.01)
(Continued)

(52) U.S. Cl.
CPC .............. *B29C 70/48* (2013.01); *B29C 70/46* (2013.01); *B29C 70/465* (2013.01); *B32B 3/266* (2013.01); *B32B 5/02* (2013.01); *B32B 5/16* (2013.01); *B32B 5/22* (2013.01); *B32B 5/26* (2013.01); *B32B 5/30* (2013.01); *B32B 7/02* (2013.01); *B32B 25/10* (2013.01); *B32B 27/12* (2013.01); *B32B 27/38* (2013.01); *B29K 2021/003* (2013.01); *B29K 2063/00* (2013.01); *B29K 2105/0809* (2013.01); *B29K 2105/089* (2013.01); *B32B 2250/03* (2013.01); *B32B 2250/40* (2013.01); *B32B 2260/023* (2013.01); *B32B 2260/046* (2013.01); *B32B 2262/0215* (2013.01); *B32B 2264/0221* (2013.01);
(Continued)

(58) Field of Classification Search
None
See application file for complete search history.

(56) References Cited

U.S. PATENT DOCUMENTS

| 6,764,754 B1 * | 7/2004 | Hunter .................. B29C 70/30 427/386 |
| 7,022,632 B2 | 4/2006 | Hatta et al. |

(Continued)

FOREIGN PATENT DOCUMENTS

DE 102011114632 A1 3/2013

OTHER PUBLICATIONS

German Patent Office, German Search Report for German Application No. 102014004387.8, dated Oct. 24, 2014.
(Continued)

*Primary Examiner* — Benjamin A Schiffman
(74) *Attorney, Agent, or Firm* — Lorenz & Kopf, LLP

(57) ABSTRACT

A composite component and its method of production are disclosed. The method includes preparing a layer structure with a support layer precursor layers on each sides of a layer of thermoplastic elastomer having gaps therein. The layer structure is heated in order to render the layer of thermoplastic elastomer plastic. The layer of thermoplastic elastomer is compressed between the support layer precursor layers for form the composite component.

12 Claims, 2 Drawing Sheets

(51) Int. Cl.
*B32B 27/12* (2006.01)
*B32B 27/38* (2006.01)
*B32B 5/26* (2006.01)
*B32B 5/02* (2006.01)
*B32B 5/16* (2006.01)
*B32B 5/22* (2006.01)
*B32B 5/30* (2006.01)
*B32B 7/02* (2006.01)
*B32B 25/10* (2006.01)
*B32B 3/26* (2006.01)
*B29K 21/00* (2006.01)
*B29K 63/00* (2006.01)
*B29K 105/08* (2006.01)

(52) U.S. Cl.
CPC ....... *B32B 2274/00* (2013.01); *B32B 2605/08* (2013.01); *Y10T 428/31515* (2015.04)

(56) References Cited

U.S. PATENT DOCUMENTS

| | | |
|---|---|---|
| 2002/0055316 A1 | 5/2002 | Araida et al. |
| 2003/0040691 A1 | 2/2003 | Griesbach et al. |
| 2004/0191441 A1 | 9/2004 | Bureau et al. |
| 2008/0277057 A1* | 11/2008 | Montgomery .......... B29C 70/08 156/307.1 |
| 2010/0170746 A1 | 7/2010 | Restuccia et al. |

OTHER PUBLICATIONS

Great Britain Patent Office, Great Britain Search Report for Great Britain Application No. 1501762.7, dated Oct. 26, 2015.

\* cited by examiner

COMPOSITE COMPONENT AND METHOD FOR ITS PRODUCTION

CROSS-REFERENCE TO RELATED APPLICATION

This application claims priority to German Patent Application No. 102014004387.8, filed Mar. 26, 2014, which is incorporated herein by reference in its entirety.

TECHNICAL FIELD

The present disclosure pertains to a composite component having at least two support layers and a layer of thermoplastic elastomer arranged between the support layers.

BACKGROUND

DE 10 2011 114 632 A1 provides an example of a composite component. A known problem of composite components, in particular such with support layers of fiber-reinforced plastic, is the tendency of suddenly braking on overloading resulting in sharp edged fragments. When such a composite component is employed in motor vehicle construction it is preferable to limit splintering when the composite component breaks up during an impact or collision. The need for lining composite components resulting from this severely restricts their possible applications, in particular in vehicle interior construction.

The chance of splinter formation however can be substantially reduced when, instead of solid moldings of fiber-reinforced plastic, composite components are employed, in which support layers of fiber-reinforced plastic are connected to one another by elastomer layers. Producing such composite components by laminating boards of fiber-reinforced plastic and cutting to size and molding the laminate so obtained involves substantial effort and costs. Direct production of composite components by placing fiber inserts and elastomer layers extending between these into a mold and subsequent injection of resin into the mold is rendered at least substantially more difficult because of the fact that the elastomer layers interfere with the spreading of the resin. While in the case of a three-layered laminate with a layer of thermoplastic elastomer between two support layers there is still at least the possibility for forming the support layers to individually inject resin into each fiber insert from different sides of the mold, such an approach in the case of laminates having a larger number of layers is no longer practical.

SUMMARY

The present disclosure provides a composite component and a method of fabrication which can be realized cost-effectively yet effectively reduce the risk of splinter formation. According to a configuration of the invention a method for producing a composite component includes: a) preparing a layer structure with at least two support layer precursor layers on both sides of a layer of thermoplastic elastomer including gaps on both sides; b) heating the layer structure in order to render the layer of thermoplastic elastomer plastic; and c) compressing the layer of thermoplastic elastomer between the support layer precursor layers.

While the gaps of the layer of thermoplastic elastomer initially permit in many places contact between the support layers and in particular also a transfer of material from one side of the layer of thermoplastic elastomer to the other, particles of the elastomer layer are flattened between the support layers during the subsequent heating and compression so that between the three layers a homogeneous connection over a large area materializes.

Compression can be performed in a mold on the entire layer structure in order to simultaneously compact the support layer precursor layers into support layers. Preferably, the support layer precursor layers include a layer of fiber material. Such a layer serves on the one hand to increase the load capacity of the finished composite component while it can serve as placeholder during the production. The fiber intermediate spaces of which are filled up with resin through impregnating. Alternately impregnating may be omitted when a prepreg is employed as fiber material insert. The component of these fibers in the volume or the mass of the support layers can amount to more than half.

Impregnation can be practically commence prior to compressing the layer of thermoplastic in order to ensure that at least during a starting phase of impregnating the gaps in the layer of thermoplastic elastomer are still large enough and allow the resin to pass through properly.

A time overlap between impregnating and compressing is desirable so that through the resin fed in during impregnating all gaps of the layer of thermoplastic elastomer are not filled up, since compressing the layer of thermoplastic material can then be carried out only with difficulty.

When the resin is fed to at least one of the support layer precursor layers through gaps of the layer of thermoplastic elastomer, this makes possible producing composite components with more than three layers. However, such a procedure is also practical in composite components having merely three layers, since it requires feeding resin in from only one side of the layer structure, thereby allowing the use of simple molds.

The layer of thermoplastic elastomer, which is inserted in step a) between the support layer precursor layers can be prefabricated in advance, in particular in the form of a fabric, of a lay or of a fleece of fibers, in the form of a perforated film or of a structure of more or less compact particles or combinations thereof, which through softening and partial fusing to one another are joined into a coherent layer. In particular, a fleece or a particle structure can also be constructed on one of the support layer precursor layers directly in step a), for example by sprinkling particles or placing filaments to form a fleece. Since the layer thus obtained need no longer be repositioned prior to compressing, cohesion of the particles or filaments of the layer among them is not necessary.

According to a configuration of the present disclosure, a composite component having at least two support layers and a layer of thermoplastic elastomer arranged between the support layers which includes gaps via which the support layers are connected in a materially joined manner. The support layers can include an insert of fiber material, wherein the materially joined cohesion between the support layers however is preferentially not formed by the fiber material but by a matrix, into which the fiber material is embedded on both sides of the layer of thermoplastic elastomer.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
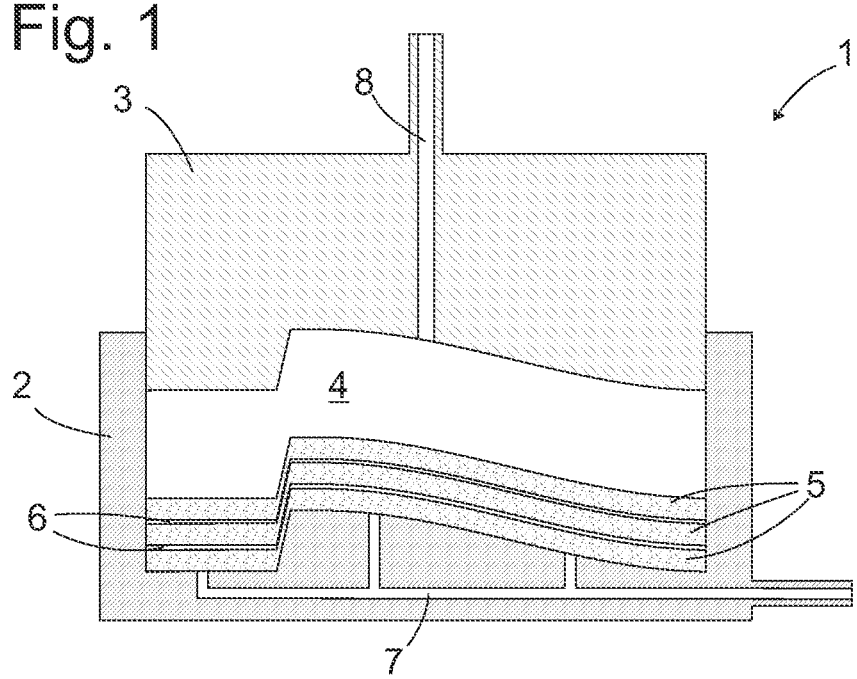
FIG. 1 shows a schematic section through a mold for carrying out the method.

In a schematic section, FIG. 1 shows a mold 1 having a lower die 2 and an upper die 3 that is shaped complementarily to the lower die 2 and moveable against the lower die 2. In a hollow space 4 between the lower die 2 and the upper die 3, three layers 5 of a loose fiber material each separated from one another by layers 6 of thermoplastic elastomer are placed. The fibers of the layers 5 can be any fibers that are used in composite material technology such as for example glass fibers, carbon fibers, aramid fibers or fibers of a natural, in particular plant origin such as for example hemp fibers such that they function as a precursor support layer. Preferably these fibers are present in the form of solid coiled continuous webs which prior to insertion into the lower die 2 merely have to be cut into a suitable shape.

The layers 6 of thermoplastic elastomer are substantially thinner than the layers 5 of fiber material. While the precursor support layers 5 generally contains a large number of fibers of filaments placed on top of one another, the number of thermoplastic elastomer filaments in the layers 6 is limited to the minimum required for cohesion of the layer. For example, the layers 6 can have the form of a loose fabric, or they can be formed as fleece, the fibers of which in order to ensure the cohesion of the fleece; adhere to one another at their points of intersection. Such layers 6 can also be supplied as coil material and be cut to the respective shape required for further processing in the mold 1. Alternately, it is conceivable to produce the arrangement of the layers 5 and 6 shown in FIG. 1 in that after each end placing of a layer 5 of fiber material into the lower die 2, particles of thermoplastic elastomer are sprinkled into the lower die 2 in order to form a layer 6, onto which in turn the next layer 5 of fiber material can be placed.

The mold 1 includes an extraction line 7, which is connected to a vacuum pump (not shown) in order to evacuate the hollow space 4 after closing of the mold when the upper die 3 is positioned in contact with the uppermost layer 5 of fiber materials and the mold is sealed air-tight. An injection channel 8 is provided in order to inject a matrix-forming resin into the evacuated hollow space 4.

Figure 2:
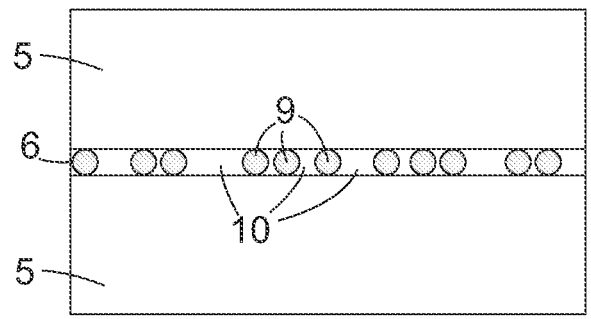
FIG. 2 shows an enlarged schematic section through layers arranged in the mold prior to injecting resin.

FIG. 2 shows in a schematic cross section a layer 6 of thermoplastic elastomer between two layers 5 of fiber material adjoining thereon prior to the injecting of the resin, In the layer 6, individual particles or filaments 9 of thermoplastic elastomer are shown in section, In the layers 5, the fibers are not shown for the sake of simplicity, although their thickness can be of a magnitude that is similar to that of the filaments 9. The filaments 9 of thermoplastic elastomer are each separated from one another by gaps 10. In the example shown here, the filaments 9 are irregularly arranged and the dimensions of the gaps 10 vary. Layers 6, with regularly arranged gaps 10 of even size such as for example a fabric or a perforated film can likewise be employed.

Figure 3:
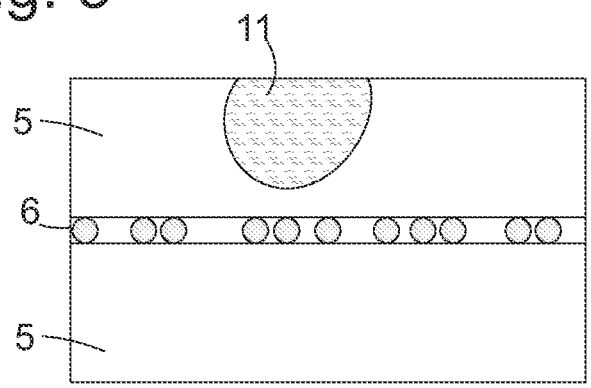
FIG. 3 shows a starting phase of the resin injection.

FIG. 3 shows the layers 5, 6 of FIG. 2 at the start of the injection of resin 11. The resin 11 to that point has impregnated a part of the upper layer 5 of fiber material, but not yet reached the layer 6 of thermoplastic elastomer.

Figure 4:
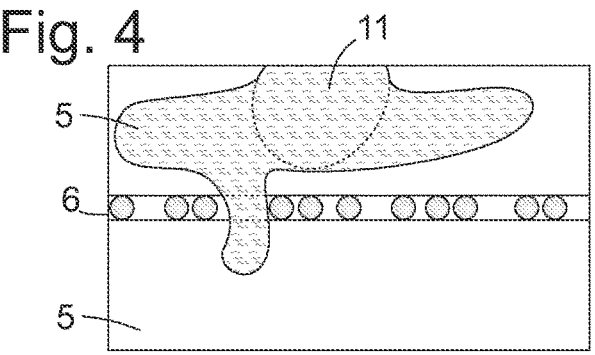
FIG. 4 shows an advanced phase, in which the resin starts to pass through a gap of the layer of thermoplastic elastomer.

In FIG. 4, the spread of the resin 11 in the upper layer 5 in lateral direction is already substantially further progressed, apart from this it has passed through a gap 10 of the layer 6 and is just starting to impregnate the lower layer 5 as well.

Figure 5:
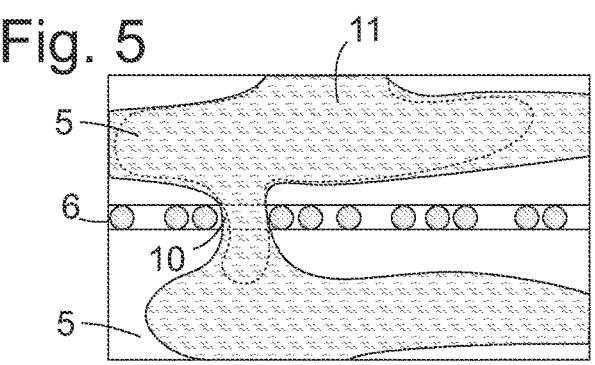
FIG. 5 shows the spreading of the resin in a support layer on the other side of the layer of thermoplastic elastomer.

In FIG. 5, the lower layer 5 is already largely impregnated by the resin 11, the gaps 10 of the layer 6, apart from one exception, are still free of resin.

Figure 6:
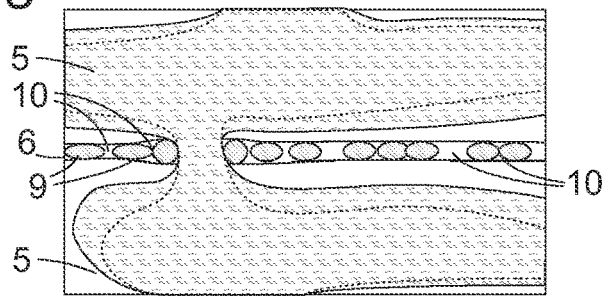
FIG. 6 shows compression accompanying the spread of the resin.

Such a spreading behavior can be achieved in particular by using thixotropic resin 11. In particular epoxy resins, which have such a flow characteristic, are available on the market and can be employed here. Thixotropic liquids are characterized in that their viscosity in the flowing state is lower than at rest. A thixotropic liquid therefore does not impregnate a substrate by advancing on a wide front but has a tendency of forming tree-like structures when advancing. When the advance of the liquid at a point of its front slows down the viscosity increases there, which additionally decelerates the spread and results in follow-up liquid draining into those places in which the front already advances briskly anyhow. For this reason it is sufficient when the resin 11 only passes through individual gaps 10 of the layer 6 in order to impregnate the layer 5 of fiber material located on the other side of the layer 6, When the injected quantity of resin 11 has reached a value preset proportionally to the mass or to the volume of the fibers of the layers 5, which preferentially is not greater than the mass or the volume of the fibers itself, compressing the layers 5, 6 between upper die 3 and lower die 2 can commence. The value should be so great that a single layer 5 of fiber material is not sufficient in order to absorb the resin 11 and consequently must have also reached the remaining layers 5 of fiber materials through the gaps of the layer (all layers) 6. The compression takes place at a temperature at which the thermoplastic elastomer of the layer 6 is plastically deformable. As shown in FIG. 6, the compression forces the resin 11 to advance on a wide front into the regions of the layers 5, 6 which are not impregnated yet. Since the fibers 9 of thermoplastic elastomer in the regions of the layers not yet impregnated are surrounded by vacuum they can yield to the pressure of the layers 5 acting on them from the top and the bottom through a flattening of cross section. Because of this, the gaps 10 between them become narrower.

Figure 7:
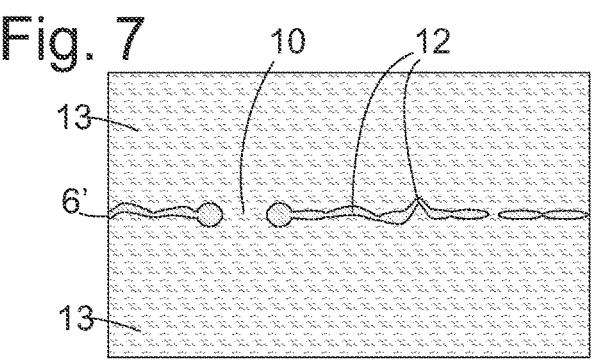
FIG. 7 shows the structure of the work piece obtained following the completion of the compression.

The compression process ends when the evacuated intermediate spaces in the layers 5, 6 are closed. With the resin 11 that entered the fiber layers 5, these are thus compressed into support layers 13. The filaments 9 of the layer 6 of thermoplastic elastomer are, as shown in FIG. 7, fused into an almost closed layer 6', in which merely those gaps 10 are still present, through which the resin 11 flowed from one layer 5 to the other. Adapting to local inhomogeneities of the support layers 13, such as for example individual projecting fibers or fluctuations of the fiber density within them, the layer 6' can have local indentations and bulges 12. Since these indentations and bulges 12 render shearing movements of the layers 5 against one another more difficult, they contribute to the strength and load capacity of the finished composite work piece.

It is easily understandable that instead of layers 5 consisting of pure fiber materials layers which are pre-impregnated with resin, so-called pre-pregs, can also be employed. Their use reduces the quantity of resin to be injected. Compression when using pre-pregs can also commence even before the injecting of resin since an earlier compression cannot result in that a fiber layer remains resin-free. In an extreme case, pre-pregs can render injecting the resin 11 entirely superfluous. In particular as the layers 5, 6 in the evacuated hollow space 4 are heated and compressed, it can then also be achieved that the particles of a layer of thermoplastic elastomer embedded between the layers 5 are flattened in cross section, so that the gaps 10 located in between largely close up and the resultant layer 6 adapts to the contours of the adjoining layers 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for producing a composite component comprising:
    preparing a layer structure having at least first and second precursor support layers and a layer of thermoplastic elastomer interposed between the first and second support layers, the layer of thermoplastic elastomer in the layer structure being formed by filaments at least partially separated from one another by gaps;
    impregnating the layer structure with a resin such that the resin flows through the first precursor support layer, through a first subset of the gaps in the layer of thermoplastic elastomer, and into the second precursor support layer, thereby resulting in a second subset of the gaps in the layer of thermoplastic elastomer that remain resin-free prior to heating;
    heating the layer structure in order to render the layer of thermoplastic elastomer into a plastic state; and
    compressing the filaments of the layer of thermoplastic elastomer between the first and second precursor support layers into the second subset of gaps in the layer of thermoplastic elastomer to form the composite component,
    wherein the heating and the compressing fuses the filaments of the layer of thermoplastic elastomer to close the second subset of gaps.

2. The method according to claim 1, wherein the compressing includes compressing the layer structure in a mold in order to compact the first and second precursor support layers into the composite component.

3. The method according to claim 1, wherein at least one of the precursor support layers comprises a layer of fiber material.

4. The method according to claim 3, wherein an amount of the fiber material in the at least one precursor support layer comprises at least one-half by volume.

5. The method according to claim 3, wherein an amount of the fiber material in the at least one precursor support layer comprises at least one-half by mass.

6. The method according to claim 5, wherein the resin has a mass that is less than the mass of the fiber material.

7. The method according to claim 1, wherein the impregnating the layer structure is initiated prior to the compressing the layer of thermoplastic elastomer.

8. The method according to claim 1, wherein the compressing the layer of thermoplastic elastomer and the impregnating the layer structure at least partially overlap in time.

9. The method according to claim 1, wherein the layer of thermoplastic elastomer is prefabricated prior to placement between the first and second precursor support layers.

10. The method according to claim 1, wherein the layer of thermoplastic elastomer is constructed on one of the first or second precursor support layer.

11. The method according to claim 1, wherein the layer of thermoplastic elastomer is selected from the group consisting of a fabric, a lay, a fleece, a perforated film, a particle structure and combinations thereof.

12. The method according to claim 1, wherein the resin is a thixotropic resin.

* * * * *